United States Patent [19]

Shirakoshi et al.

[11] Patent Number: 4,587,418
[45] Date of Patent: May 6, 1986

[54] OPTICAL READER WITH OPTICAL ELEMENTS MOUNTED ON MOLDINGS

[75] Inventors: Hiroshi Shirakoshi; Masafumi Matsumoto; Ryoichi Kawai; Matahira Kotani, all of Nara, Japan

[73] Assignee: Sharp Kabushiki Kaisha, Osaka, Japan

[21] Appl. No.: 620,007

[22] Filed: Jun. 12, 1984

[30] Foreign Application Priority Data

Jun. 21, 1983 [JP] Japan ................................. 58-113183

[51] Int. Cl.$^4$ .............................................. H01J 3/16
[52] U.S. Cl. .................................... 250/216; 250/239
[58] Field of Search ................ 250/239, 216; 350/622, 350/618, 631, 616; 355/8, 11

[56] References Cited

U.S. PATENT DOCUMENTS 4,206.991  6/1980  Kobori et al. .................. 350/618 X
4,444,488  4/1984  Fujii et al. ......................... 355/8 X Primary Examiner—John P. McIntosh
Attorney, Agent, or Firm—Birch, Stewart, Kolasch & Birch

[57] ABSTRACT

An optical reader reads draft picture information by guiding reflection light from the optically scanned draft onto the reader element. The optical reader embodiment is provided with the molded supporting member that integrally secures a plurality of blocks supporting the optical elements including a plurality of reflection mirrors that guide the reflection light onto the reader element, a focus lens that focuses the reflection light projected from these reflection mirrors onto the reader element, and the reader element, respectively. Spring clips are used to secure the reflection mirrors to corresponding blocks of the molded supporting member.

7 Claims, 2 Drawing Figures

OPTICAL READER WITH OPTICAL ELEMENTS MOUNTED ON MOLDINGS

BACKGROUND OF THE INVENTION

The present invention relates to an optical reader which is provided for either a facsimile machine or an optical character reader, and more particularly, to the optical unit supporting mechanism thereof.

Conventionally, the optical unit of any type optical reader comprises a plurality of reader elements such as the CCD sensor, lenses, and reflection mirrors. In order to illuminate drafts using an illumination source and securely focus the reflected light carrying the picture information developed from the drafts onto the reader elements such as the CCD sensor, it was necessary in any conventional optical reader to individually adjust the positions of lenses and reflection mirrors so that they can be properly positioned in conjunction with the three axes X, Y, and Z.

To achieve this, conventionally, optical elements including the reader elements, lenses, and reflection mirrors have been independently installed into the proper location within the device. However, such a configuration requires delicate adjustment between these elements, and yet, even if these elements have been properly adjusted, they will eventually move out of the precise positions after many years services. Above all, such a configuration always requires extremely complex manual operations during assembly.

OBJECT AND SUMMARY OF THE INVENTION

The present invention aims at eliminating such an inconvenience still present in the assembly of the optical readers by previously assembling those optical elements onto integrally formed molded parts, followed by installation of the molded parts in the optimum spacial positions with the optical reader unit.

The preferred embodiment of the present invention provides means for integrally installing a variety of optical elements including a plurality of reflection mirrors, lenses, and reader elements onto the pre-determined blocks of the molded parts, followed by installation of the molded parts complete with the optical elements onto the optimum spacial positions of the optical reader unit, thus providing an easier and convenient assembly work.

In addition, such a delicate relationship between each optical element can be accurately pre-set merely by installing each element onto the designated block position of the molded part. As a result, all the complex adjustment procedures thus far needed for conventional optical elements are no longer required, thus realizing an easier and convenient assembly operation.

In order to realize compact sizes of such optical elements, it is necessary to reduce the distance between the positions of the draft and the reader elements. However, the shorter the distance between these, the greater will be the number of reflection mirrors needed, and yet, such a large number of reflection mirrors will require factory employees to spend a considerable time properly adjusting the positions of these mirrors.

Conversely, since the preferred embodiment of the present invention provides means for integrally assembling these optical elements onto the molded parts, actually, no adjustment is necessary for properly positioning these elements, thus providing a significant advantage in order to realize compact-size optical elements.

DETAILED DESCRIPTION OF THE INVENTION

Figure 1:
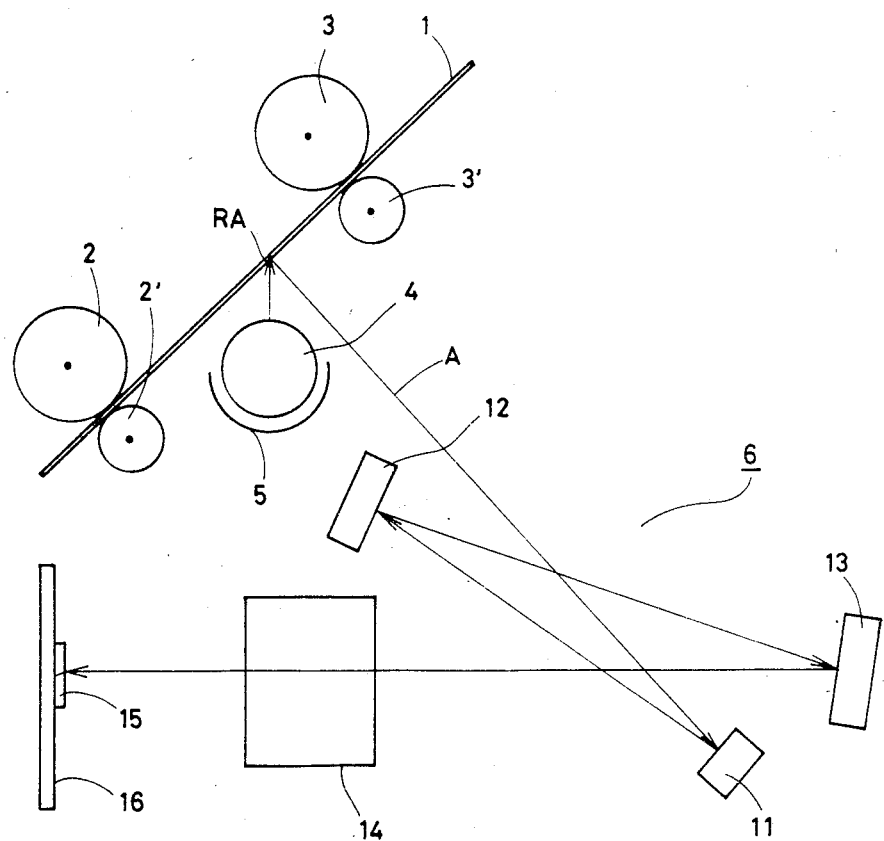
FIG. 1 is a simplified block diagram of the optical elements of the optical reader unit as utilized by the preferred embodiment of the present invention.

FIG. 1 shows a simplified block diagram of the draft illumination device and the optical elements embodied by the present invention. In FIG. 1, draft 1 is first delivered to the designated position by rollers 2, 2', 3, and 3', and then the portion of the draft 1 to be read is illuminated by a light source, for example, a fluorescent lamp 4. A reflection sheet 5 is located in a position beneath the fluorescent lamp 4 opposite the draft 1. Beams emitted from the light source first reflect themselves at the reflection point RA of the draft surface, and then the reflected light A is transmitted to the optical assembly 6, which comprises reflection mirrors 11, 12, and 13, the focus lens 14, and the circuit board 16 incorporating the reader element 15 which is a CCD sensor.

The reflected light A is reflected by the first mirror 11 before it is sent to the second mirror 12, which then transmits the reflected light to the third mirror 13. The reflected light from the third mirror 13 is eventually delivered to the reader element 15 via the focus lens 14.

Reflection mirrors 11, 12, and 13, the focus lens 14, and the reader element 15 supported on the circuit board 16, are integrally installed onto the molded part, in which, the positions of these optical elements have been accurately pre-determined before assembly, thus eliminating the needs for adjusting the positions between these elements after completing the initial installation work.

Figure 2:
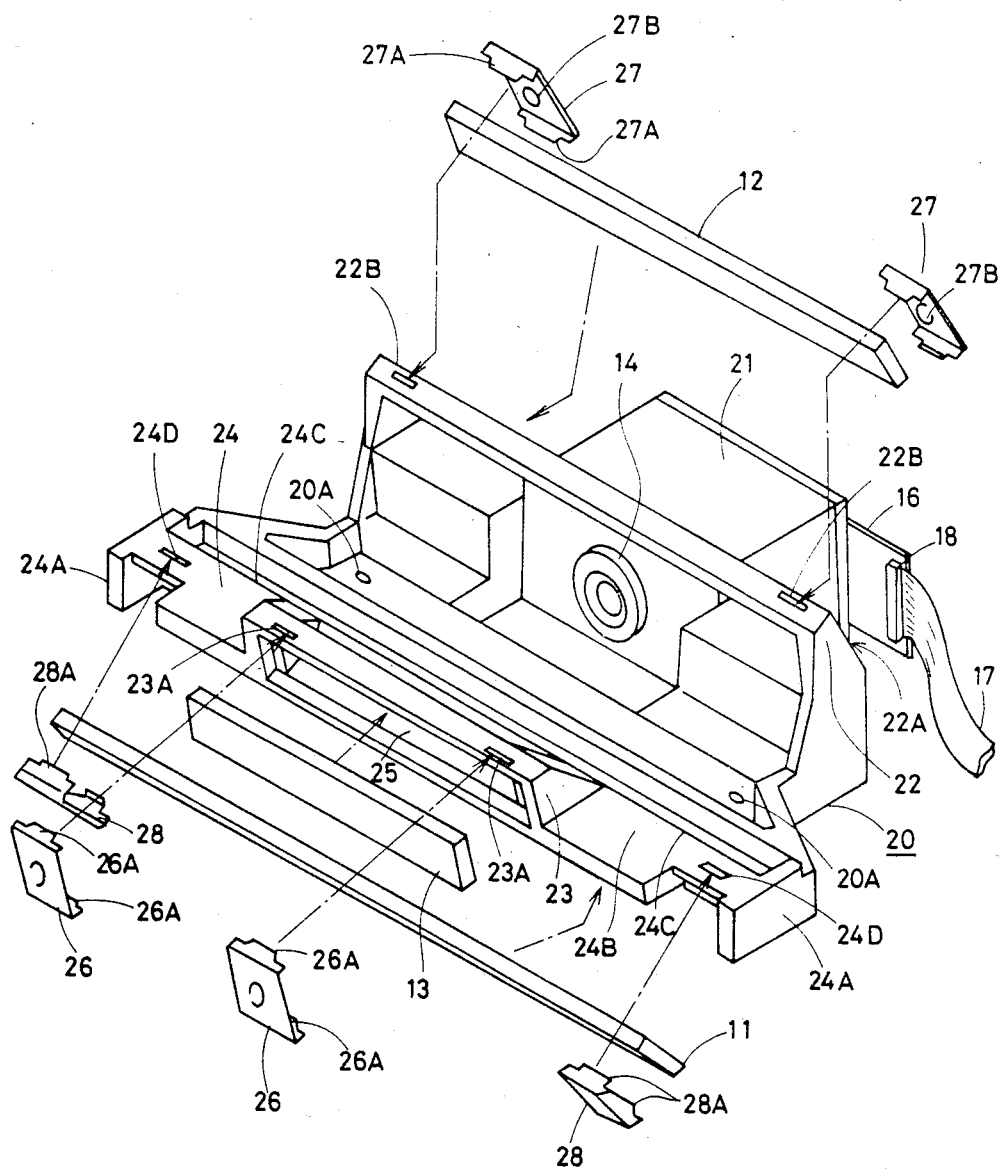
FIG. 2 is a structural and schematic diagram of the optical elements of the optical reader unit as used in the preferred embodiment of the present invention.

FIG. 2 shows the configuration embodied by the present invention, in which the optical elements 6 mentioned above have been integrally built in the molded parts, respectively.

The molded part 20 has been integrally composed of plastic material and comprises a variety of blocks including the following:- the lens support block 21 supporting the focus lens 14; the second reflection mirror support block 22 that mounts the second mirror 12 standing upright in front of the lens support block 21; the third reflection mirror support block 23 that mounts the third mirror 13 being set in the position in front of and slightly below the second mirror support block 22, i.e., in the position being opposite from the lens support block 21; and the first mirror support block 24 that mounts the first reflection mirror 11 being set in the position just below the third mirror support block 23.

There is a round hole for mounting the focus lens 14, that penetrates from the front edge to the rear surface of the lens support block 21. The focus lens 14 is secured to the front edge of the hole, while the hole space transmits the light entering through the focus lens 14.

The reader element 15 which is made of the CCD sensor is set to the rear edge of the hole that penetrates the lens support block 21, and therefore, the circuit board 16 incorporating the reader element 15 is secured to the rear surface of the lens support block 21 with screws. A cable 17 is extended from the circuit board 16 via connector 18 so that the circuit board can be connected to the control circuit of the optical reader.

The third mirror support block 23 has an open space 25 that receives the third reflection mirror 13. After securing the third reflection mirror 13 to the open space 25, the rear surface of the reflection mirror 13 is set to the support block 23 via the aid of a pair of spring clips or leaf springs 26. Each of the leaf springs 26 has L-shaped stoppers 26A in its upper and lower edges. Likewise, the third reflection mirror support block 23 has a pair of grooves 23A in the upper and lower surfaces for receiving the L-shaped stoppers 26A. By causing a pair of stoppers 26A of the two leaf springs 26 to be respectively engaged with the corresponding grooves 23A, the third reflection mirror is secured to the designated position. Although FIG. 2 doesn't clearly show the status of the second reflection mirror support block 22 and the first reflection mirror support block 24, they respectively allow the second and the first reflection mirrors to be installed into the open space with the aid of the leaf springs as was done by the third reflection mirror support block. In other words, the second reflection mirror support block 22 is provided with an open space that allows the second reflection mirror 12 to be installed into the tilt surface 22A that inclines against the third reflection mirror 13, whereas the second reflection mirror 12 is secured onto the second reflection mirror support block 22 using two leaf springs 27/27.

Reference number 22B indicates a pair of grooves to which two stoppers 27A of the leaf springs 27 are respectively inserted. Since the first reflection mirror support block 24 is positioned just below the third reflection mirror support block 23, it is not clearly shown in FIG. 2. However, there is an open space at the surface 24C which is adjacent to the vertical walls 24A and the horizontal wall surface 24B of the first reflection mirror support block 24, thus allowing it to receive the first reflection mirror 11 which is secured to the block 24 by two leaf springs 28.

Reference number 24D indicates a pair of grooves that receive two stoppers 28A of two leaf springs 28.

In other words, the structural relationship between the lens support block 21, the second reflection mirror support block 22, the third reflection mirror support block 23, and the first reflection mirror support block 24, has been accurately and delicately established so that the focus lens 14, reflection mirrors 11, 12, and 13 are exactly in the relationship shown in FIG. 1.

As a result, the optical elements 6 including the first, second, and the third reflection mirrors 11, 12, and 13, the focus lens 14, and the reader element 15, are precisely installed onto the specific blocks of the molded part 20 by the pre-determined positioning, thus effectively eliminating the needs for performing such a delicate position adjustment otherwise needed during and after the assembly work.

The molded part 20 is provided with a pair of screw holes 20A. Using these holes, the molded part 20 is secured to the main unit, i.e., the optical reader, with screws. As is clear with the two leaf springs 27 for example, a pair of projections 27B projecting towards the back of the reflection mirror 12 are provided in the positions in contact with the back of the second reflection mirror 12, thus enabling the reflection mirror 12 to be securely installed by the pressure generated by the projections 27B, which is being applied against the support block 22 from the reflection mirror 12 and its back. Likewise, the leaf springs 26 and 28 are respectively provided with the same projections as with the projections 27B.

What is claimed is:

1. An optical reader that reads draft picture information by guiding light reflected from the optically scanned draft onto a reader element comprising;
   a plurality of reflection mirrors forming an optical system for guiding the reflection light onto said reader element;
   a focus lens focussing the light reflected from said reflection mirrors onto said reader element;
   a molded one piece supporting member which integrally includes a plurality of reflection mirror supporting sections, a focus lens supporting section and a reader element supporting section, and
   means for securing said plurality of reflecting mirrors, said focus lens and said reader elements to their corresponding said reflection mirror supporting sections, focus lens supporting section and reader element supporting section of said molded supporting member;
   said molded one piece supporting member accurately aligning said reflection mirrors, focus lens and reader element to avoid the need for position adjustments thereto.

2. The reader of claim 1 wherein said means for securing includes a plurality of spring clips securing each said reflecting mirror to a corresponding said reflection mirror supporting section.

3. The reader of claim 2 wherein said focus lens supporting sections includes a hole through which said focus lens extends, said means for securing fastening said focus lens to the periphery of said hole.

4. The reader of claim 3 wherein said reader element is mounted to a circuit board;
   said means for securing including screws for fastening said circuit board to said reader element supporting section.

5. The reader of claim 4 wherein said reader element is a CCD sensor.

6. The reader of claim 2 wherein said supporting member is molded of plastic.

7. The reader of claim 4 wherein said supporting member is molded of plastic.

* * * * *